(12) United States Patent
Beaurepaire

(10) Patent No.: US 9,639,994 B2
(45) Date of Patent: May 2, 2017

(54) OPTIMIZED PARKING SYSTEM

(71) Applicant: HERE Global B.V., Veldhoven (NL)

(72) Inventor: Jerome Beaurepaire, Berlin (DE)

(73) Assignee: HERE Global B.V., Eindhoven (NL)

( * ) Notice: Subject to any disclaimer, the term of this patent is extended or adjusted under 35 U.S.C. 154(b) by 2 days.

(21) Appl. No.: 14/584,670

(22) Filed: Dec. 29, 2014

(65) Prior Publication Data

US 2016/0189435 A1    Jun. 30, 2016

(51) Int. Cl.

| | |
|---|---|
| *G06F 7/10* | (2006.01) |
| *G06G 7/78* | (2006.01) |
| *G08G 1/16* | (2006.01) |
| *G07B 15/02* | (2011.01) |
| *G06Q 30/02* | (2012.01) |
| *G05D 1/02* | (2006.01) |
| *G08G 1/005* | (2006.01) |
| *G08G 1/14* | (2006.01) |
| *G08G 1/00* | (2006.01) |
| *H04W 4/02* | (2009.01) |
| *H04W 4/04* | (2009.01) |

(52) U.S. Cl.
CPC ............ *G07B 15/02* (2013.01); *G05D 1/021* (2013.01); *G06Q 30/0208* (2013.01); *G08G 1/005* (2013.01); *G08G 1/144* (2013.01); *G08G 1/147* (2013.01); *G08G 1/202* (2013.01); *G08G 1/205* (2013.01); *H04W 4/02* (2013.01); *H04W 4/021* (2013.01); *H04W 4/046* (2013.01)

(58) Field of Classification Search
CPC .......... G08G 1/14; G08G 1/017; G08G 1/141; G08G 1/148; G08G 1/144; G08G 1/147; G08G 1/202; G08G 1/205; B62D 15/027; G07B 15/02; G07F 17/24; G06Q 30/0284; G06Q 50/30; G06Q 20/145; G06Q 30/0208; B60W 30/06; B60W 10/20; G05D 2201/0213; G05D 1/021; H04W 4/02; H04W 4/021; H04W 4/046
USPC ...................................................... 701/13, 23
See application file for complete search history.

(56) References Cited

U.S. PATENT DOCUMENTS

| | | | |
|---|---|---|---|
| 7,049,979 B2 | 5/2006 | Dunning | |
| 7,253,747 B2 * | 8/2007 | Noguchi | ................... G08G 1/14 340/932.2 |
| 7,538,690 B1 | 5/2009 | Kaplan et al. | |
| 7,893,847 B2 * | 2/2011 | Shanbhag | ................ G08G 1/14 340/435 |
| 7,949,464 B2 | 5/2011 | Kaplan et al. | |

(Continued)

*Primary Examiner* — Nicholas Kiswanto
*Assistant Examiner* — Rachid Bendidi
(74) *Attorney, Agent, or Firm* — Lempia Summerfield Katz LLC

(57) ABSTRACT

Parking spaces are optimized by orchestrating the movement of one or more autonomous vehicles or shared vehicles. A computing device monitors locations of multiple vehicles. The computing device receives a request for a parking space from a user at or in route to a geographic location. The computing device selects one of the monitors vehicles based on the geographic location of the parking request. The computing device generates an instruction to make available a parking space of the selected one of the vehicles. In the case of autonomous vehicles, the vehicle drives away from the parking space. In the case of shared vehicles, a rental appointment is modified to make the parking space available.

16 Claims, 9 Drawing Sheets

(56) References Cited

U.S. PATENT DOCUMENTS

| | | |
|---|---|---|
| 8,063,797 B1 | 11/2011 | Sonnabend et al. |
| 8,606,499 B2 | 12/2013 | Li et al. |
| 2004/0032342 A1 | 2/2004 | Dunning |
| 2009/0187341 A1 | 7/2009 | Vavrus et al. |
| 2009/0260907 A1* | 10/2009 | Moshchuk ......... B62D 15/0285 180/167 |
| 2010/0017118 A1 | 1/2010 | Dougherty |
| 2010/0204866 A1* | 8/2010 | Moshchuk ......... B62D 15/0285 701/25 |
| 2010/0302068 A1* | 12/2010 | Bandukwala ......... H04W 4/046 340/932.2 |
| 2011/0213629 A1* | 9/2011 | Clark ..................... G06Q 10/02 705/5 |
| 2012/0092191 A1* | 4/2012 | Stefik ..................... G06Q 10/02 340/932.2 |
| 2012/0095791 A1* | 4/2012 | Stefik ..................... G06Q 10/02 705/5 |
| 2012/0098677 A1 | 4/2012 | Geelen |
| 2012/0197690 A1 | 8/2012 | Agulnek |
| 2013/0231824 A1* | 9/2013 | Wilson ................. G05D 1/0088 701/26 |
| 2014/0121883 A1* | 5/2014 | Shen ................... B62D 15/0285 701/28 |
| 2014/0266805 A1* | 9/2014 | Tippelhofer ........... G08G 1/143 340/932.2 |
| 2014/0278081 A1 | 9/2014 | Iwuchukwu |
| 2015/0088358 A1* | 3/2015 | Yopp ..................... B60W 10/04 701/23 |
| 2015/0142244 A1* | 5/2015 | You ....................... G05D 1/0061 701/23 |
| 2015/0149265 A1* | 5/2015 | Huntzicker ........... B60W 30/06 705/13 |
| 2015/0233719 A1* | 8/2015 | Cudak .................... B60K 35/00 701/23 |
| 2015/0241241 A1* | 8/2015 | Cudak .................. B62D 15/027 701/408 |
| 2015/0309510 A1* | 10/2015 | Cudak ................... G05D 1/0246 701/23 |
| 2015/0339928 A1* | 11/2015 | Ramanujam ......... G05D 1/0212 701/23 |
| 2015/0346727 A1* | 12/2015 | Ramanujam ....... B62D 15/0285 701/23 |

\* cited by examiner

OPTIMIZED PARKING SYSTEM

FIELD

The following disclosure relates to optimized parking systems, or more particularly, to systems and methods for generating vehicles instructions based on parking requests.

BACKGROUND

In many urban locations, parking is a significant inconvenience for drivers. Parking costs have soared. Parking zone are a maze of regulations. Perhaps most importantly, parking spots at prime locations and/or prime time period may be scarce. When human beings select parking spots, they are selfish. A driver may take up two parking spots in situations in which the vehicle could have made room for another vehicle. Small vehicles park in large parking spots in situations where smaller spots are available nearby.

A driver heading home, may park in a high demand spot in front of a business when residential parking spots are the same distance to the driver's home. There are no incentive for individual drivers to park in a manner that is most efficient for the entire parking community. Recent technologies such as autonomous vehicles and shared vehicles may provide opportunities for optimizing parking arrangements.

SUMMARY

In one embodiment, the locations of multiple vehicles are monitored. A request for a parking space is received from a user. The request is associated with a geographic location. One of the vehicles is selected based on the geographic location, and an instruction is generated to make available a parking space of the selected one of the vehicles in response to the request for the parking space. The instruction includes data identifying the selected one of the plurality of vehicles.

In one embodiment, the locations of a plurality of autonomous vehicles are monitored. In response to a request for a parking space received from a mobile device and including a geographic location of the mobile device, one of the plurality of autonomous vehicles that is located at a parking space within a predetermined distance of the geographic location of the mobile device is selected. An instruction is generated for the selected one of the plurality of autonomous vehicles to vacate the parking space in response to the request for the parking space from the mobile device.

In one embodiment, the locations of a plurality of shared vehicles are monitored. A request for a parking space from a first mobile device and including a geographic location of the first mobile device is received. A request for a shared vehicle from a second mobile device and including a geographic location of the second mobile device is received. An available subset of shared vehicles from the plurality of shared vehicles based on the geographic location of the second mobile device is identified. In response to the request for the parking space, one of the available subset of shared vehicles is selected based on the geographic location of the first mobile device, and an instruction for the second mobile device and including data indicative of the selected one of the shared vehicles is generated.

BRIEF DESCRIPTION OF THE DRAWINGS

Exemplary embodiments are described herein with reference to the following drawings.

DETAILED DESCRIPTION

It is difficult to manage a herd of individual drivers to select the most efficient parking arrangements. However, autonomous vehicles and shared vehicles may be partially managed to optimize parking for other drivers.

The term autonomous vehicle refers to a vehicle including automated mechanisms for performing one or more human operated aspects of vehicle control. A vehicle that parks itself does not need to be as close to the desired locations human drivers might prefer. For example, a passenger may be driven to his home or destination, dropped off at the front door, and the autonomous vehicle may drive far away to find available parking. When the vehicle is needed again, the autonomous vehicle returns to the user's location. Thus, the problem of searching for available parking may be eliminated for users of autonomous vehicles.

In addition, autonomous vehicles may also alleviate the parking needs of other users. An autonomous vehicle parked in a particular location may be instructed to drive away from the parking space in order to free up the parking space for another user.

Shared vehicles, which may be autonomous or not autonomous, may also be utilized to optimize parking, or free up parking locations for other drivers. Shared vehicles may be organized as car clubs or membership. A member subscribes to a car sharing service for a periodic (monthly or annual) fee or a pay-per-use fee, or both. The shared vehicles are owned by the organization and members have access to use the vehicles for short time periods. Drivers that make only occasional use of vehicles may find financial benefits from shared vehicle over conventional car ownership. In addition, drivers who wish to have a second or more luxurious car for entertaining clients or other purposes may take advantage of shared vehicles.

A shared vehicle system may alleviate the parking needs of other users. Consider an example in which multiple shared vehicles are available in an area. A user requests to rent one of the shared vehicles. The user may be directed to a shared vehicle that is in a high demand parking location or at a parking space that is being requested by another driver. The shared vehicle is moved, opening up the parking space to the other driver.

Figure 1:
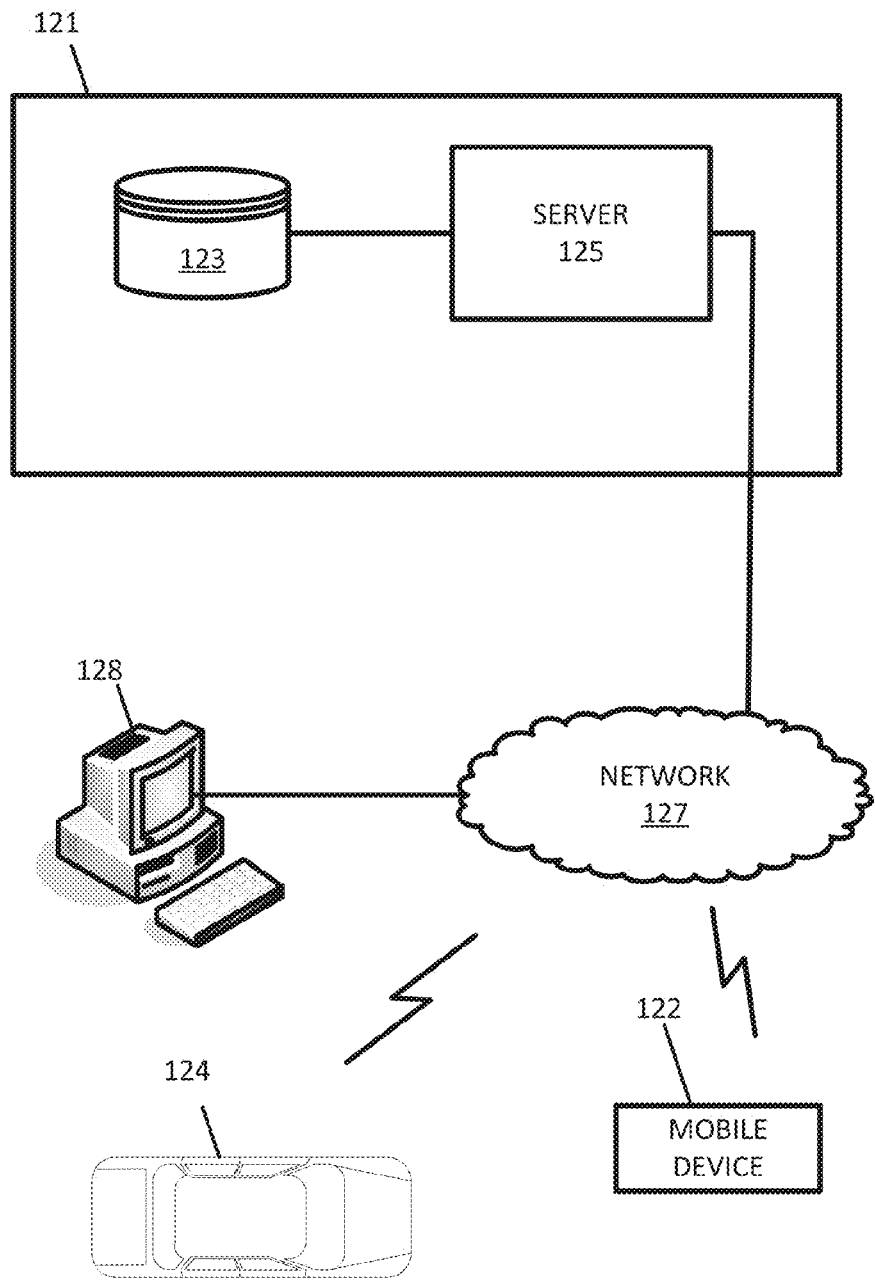
FIG. 1. illustrates an example system for optimizing parking.

FIG. 1. illustrates an example system 120 for optimizing parking. The system 120 includes a management system 121, one or more mobile devices 122, a vehicle 124, a workstation 128, and a network 127. Additional, different, or fewer components may be provided. For example, many mobile devices 122 and/or workstations 128 connect with the network 127. The management system 121 includes a server 125 and one or more databases. The database 123 may be a geographic database including road links or segments.

The vehicles 124 may be autonomous vehicles or shared vehicles. Each of the vehicles 124 may be associated with a mobile device that is integrated with the vehicle (e.g., in dash parking system or in dash navigation system with parking). In another example, the mobile device is a smartphone or another device carried on the person of the driver. The mobile device may run a mobile software application for parking optimization. The mobile device and associated vehicle collectively may be referred to as vehicle 124 or order to be distinguished from mobile devices 122. The mobile devices 122 may be smartphones or other personal devices. The mobile device 122 may be carried by any type of vehicles (not only autonomous of shared vehicles). The mobile device 122 may also be integrated into the vehicle.

The geographic location of the vehicles 124 may be determined using a global positioning system (GPS) or another location system. The vehicles 124 may send their respective geographic positions (e.g., latitude and longitude coordinates or street address) to the server 125, which monitors the locations of the vehicles 124 or the mobile devices associated with the vehicles 124.

The server 125 may receive a request for a parking space from a user associated with the mobile device 122. The mobile device 122 also employ GPS or another location system and include data indicative of geographic location in the request.

The server 125 may select one of the vehicles 124 based on the geographic location. For example, the server 125 compares the geographic location of the mobile device 122 requesting a parking space with current parked locations of the vehicles 124. The server 125 may define a geographic region near the mobile device 122. The geographic region may be defined by a predetermined radius (e.g., 50 meters, 100 feet, 2 blocks, or another size). The server 125 may select one or all of the parked vehicles 124 in the geographic region.

In one example, the server 125 has also received a request for a shared vehicle. The server 125 may assign one of the parked vehicles to the request for the shared vehicle. The server 125 may compare the geographic position of the mobile device 122 to the available shared vehicles 124. When one of the shared vehicles 124 is within the geographic region, that vehicle is assigned to the request.

The server 125 may generate an instruction to make a parking space for the selected vehicle available in response to the request for the parking space. The instruction includes data indicative of the selected one of the vehicles. The instruction may be in response to the request for a shared vehicle. The instruction may be an instruction for the user that request the shared vehicle user to pickup or rent the selected vehicle. In the case of autonomous vehicles, the instruction may be an instruction for the selected vehicle to vacate or drive away from the parking space and seek alternative parking.

The mobile device 122, in addition to the mobile device associated with vehicle 124, may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include relational database service devices, mobile phone devices, or car navigation devices.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

Figure 2:
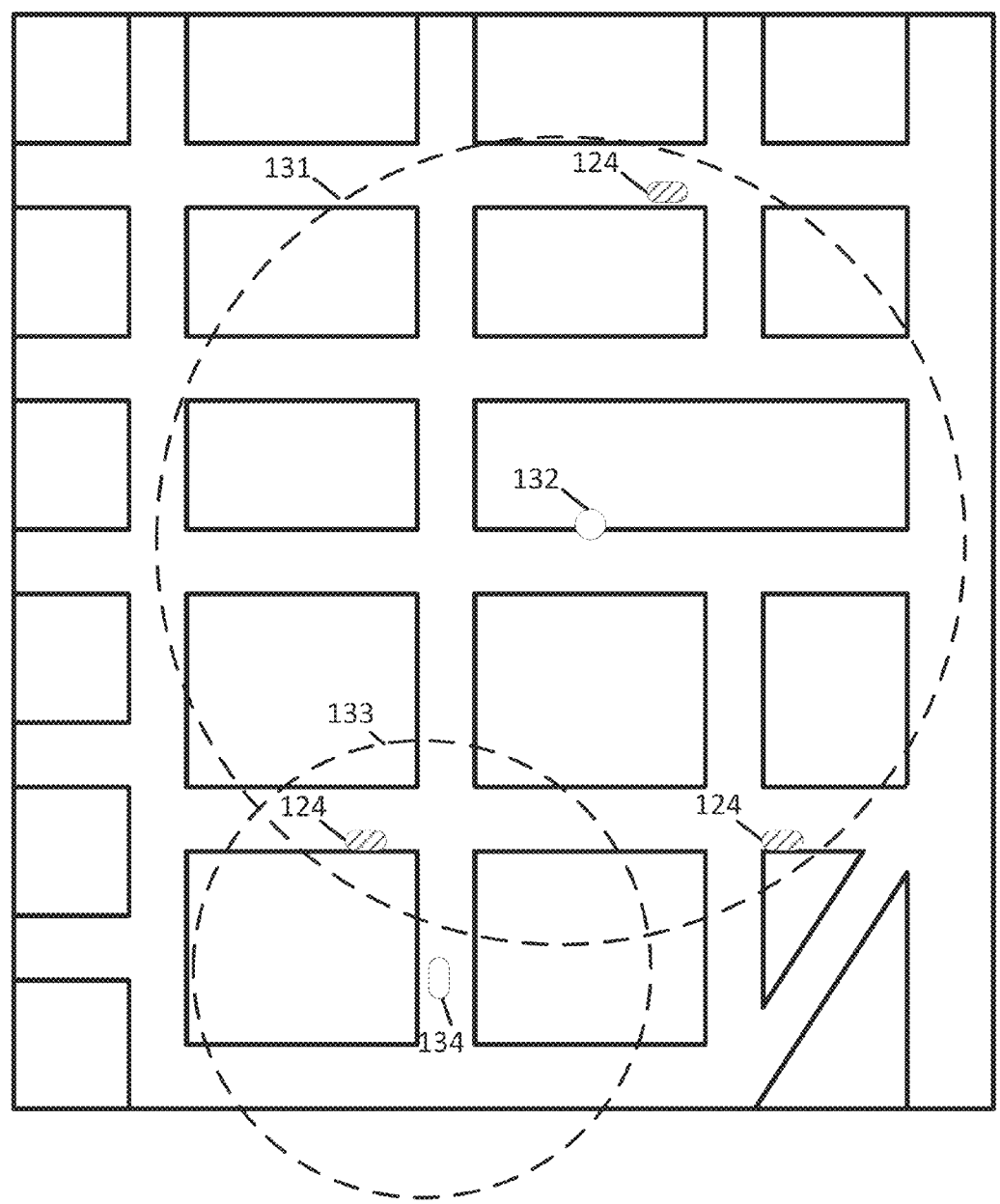
FIG. 2 illustrates an example for optimizing parking with shared vehicles.

FIG. 2 illustrates an example map 130 for optimizing parking with shared vehicles or rental vehicles (e.g., short term rental vehicles or hourly rental vehicles). The map 130 may be for illustrative purposes and not actually generated or displayed by the system. However, the map 130 may be displayed by workstation 128 or the mobile device 122. The map 130 illustrates locations of parked vehicles 124. The parked vehicles 124 may be registered by the car sharing service.

A variety of techniques may be used for providing access to the shared vehicles 124. In one example, the user is provided an access code to enter on a keypad on the side of the vehicle. In response to the access code, the door unlocks. The code may also be used to start the vehicle, or the keys may be left inside. In one example, the user runs a mobile application that unlocks the vehicle.

In some implementations the shared vehicles are parked in designated spaces. However, in some implementations shared vehicles may be parked in any normal parking space along the street or in public lots. The shared vehicles may be excused from parking fees (e.g., parking meters) based on arrangements with various municipalities.

A user 132, which may correspond to another mobile device, sends a request for a shared car. The user 132 may open a mobile application and request the location of available shared cars near him. The server 125 may construct a geographic region 131 around the user 132. In the example shown, three shared vehicles are available in the geographic region. The size of the geographic region 131 may be a predetermined size or a size specified by the user 132.

Another user 134, which may correspond to another mobile device, sends a request for a parking space. The server 125 may construct another geographic region 133 around the user 134. The size of the geographic region 133 may be a predetermined size or a size specified by the user 134.

The server 125 may calculate an overlapping area of the geographic region 131 and geographic region 133. The server 125 may determine whether any of the shared vehicles are parked in the overlapping area. The server 125 may generate a message to the user 132 to pick up the shared vehicle 124 in the overlapping region. In addition, the server 125 may generate a message to the user 134 that a parking space is opening up. Both messages may include a location of the shared vehicle 124.

The message for the user 132 may include may provide an incentive to select the shared vehicle 124. The incentive may be a discount off renting the vehicle or a future rental. The incentive may be a free upgrade or a coupon for another product. The inventive may be in the form of a guaranteed parking space when the user arrives at the destination. The incentive encourages the user 132 to select one of the rental vehicles instead of another of the rental vehicles. Alternatively, no incentive may be provided to the user 132. The process may be hidden from user 132. In other words, the user 132 may not be informed that other shared vehicles were available. The server 125 may provide the shared vehicle in the overlapping region as the only available shared vehicle for the user 132.

The message for the user 134 may include may request a payment for the parking space. The payment may counteract the cost of the incentive provided to the user 132. Therefore, the message may state "parking available on this block for a relocation fee of $2." The message may include routing instructions to the location of the shared vehicle 124. The message may include a nearby address to the shared vehicle 124.

Figure 3:
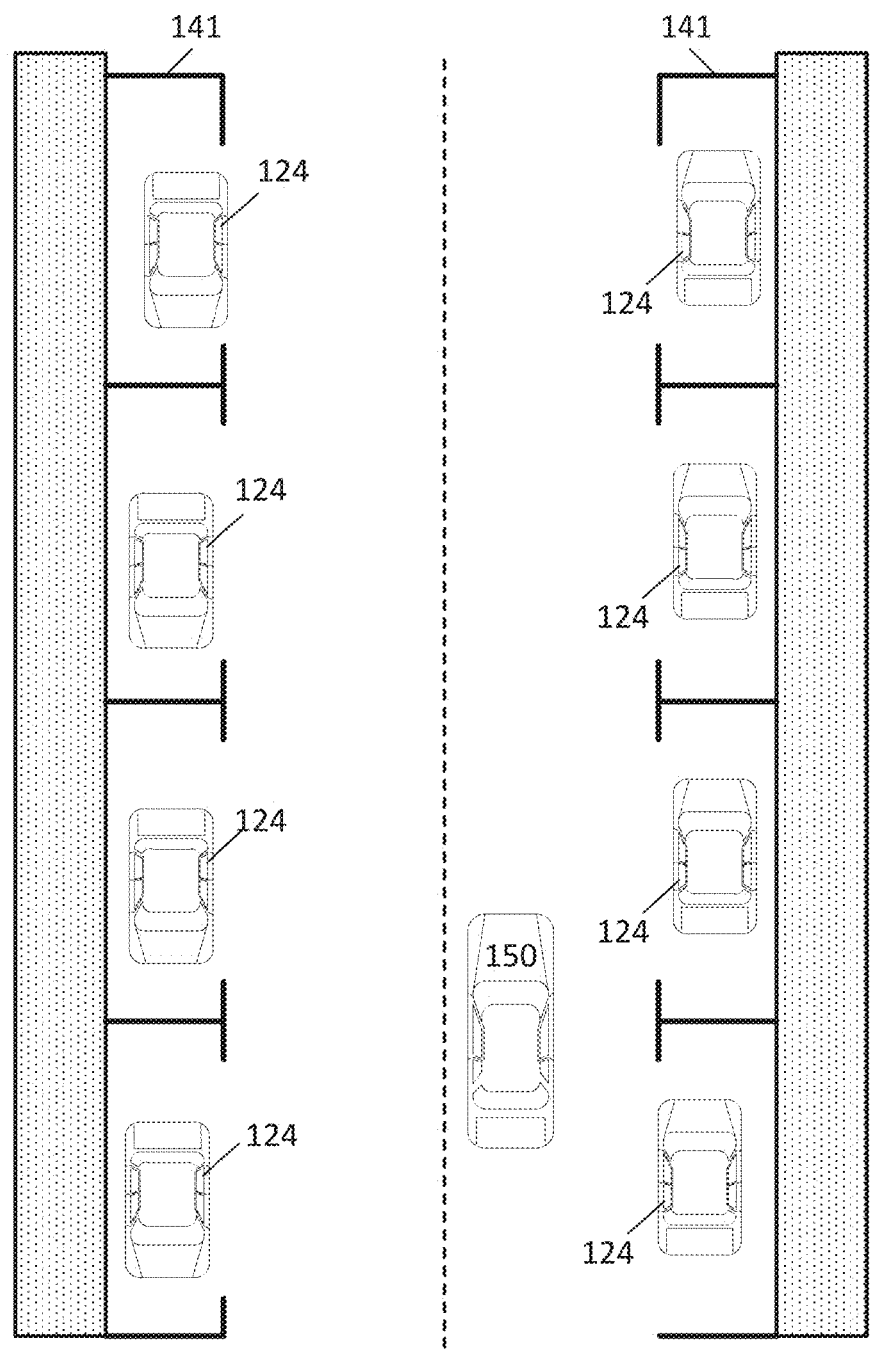
FIG. 3 illustrates an example for optimizing parking with autonomous vehicles.

FIG. 3 illustrates an example for optimizing parking with autonomous vehicles. Multiple parking spaces 141 are arranged along a street. One or more of the parking spaces 141 are occupied by autonomous vehicles 124.

The server 125 is configured to monitor locations of the autonomous vehicles 124 based on position data received from the vehicles 124. The locations may be stored in a lookup table that is periodically updated. In some examples, the server 125 sends a location request to autonomous vehicles on a schedule (e.g., every 10 minutes) and receives back the current geographic coordinates. In another example, the vehicles 124 report their new locations any time their locations change.

The server 125 receives a request for a parking space from a mobile device 150. The mobile device 150 may be a smartphone, laptop computer, or integrated with the vehicle. The request for a parking space may include the current location of the mobile device 150. The server defines a geographic region based on current location of the mobile device 150. For example, the region may be a city block including the mobile device 150. In another example, the region may be a circle or rectangle of geographic area around the location of the mobile device 150. The size of the circle or rectangle may be a predetermined size or set by the user.

The server 125 identifies autonomous vehicles in the geographic region. The server 125 queries the lookup table of parked autonomous cars according to the location received from the mobile device 150. The server 125 may compare the location of the mobile device 150 to locations in entries of the lookup table. If any of the entries are within geographic region, the server 125 selects the corresponding vehicle. The server 150 generates an instruction for the selected autonomous vehicle to vacate the parking space.

In some examples, there may be multiple parked autonomous vehicles within the geographic region. The server 125 may select the closest parked autonomous vehicle to the location of the mobile device 150. The server 125 may select the parked autonomous vehicle that is downstream of the mobile device 150 and on the same side of the street so that the driver does not have to turn the vehicle around or otherwise perform maneuvers to arrive at the parking space.

The server 125 sends the instruction to selected autonomous vehicles. The instruction instructs the autonomous vehicle to vacate the parking space. The server 125 may calculate the estimate time of arrival (ETA) for the mobile device 150 and include the ETA In the message. The server 125 may track the location of the mobile device 150 and instruct the autonomous vehicle to move when the mobile device 150 is very near. Accordingly, other unrelated drivers will not have the option to take the parking space.

The instruction may provide the location of an alternative parking space for the autonomous vehicle and/or routing directions to the alternative parking space. In one example, the directions to the alternative parking space may consider the location of the mobile device 150 and select a route that does not cause additional traffic for the vehicle associated with mobile device 150 as it heads towards the new parking space. Alternatively, the location of the alternative parking space may be selected so as not to cause additional traffic for the vehicle associated with mobile device 150 as it heads towards the new parking space.

In some example, the vehicle associated with the mobile device 150 is strategically routed toward the new parking space. Consider the example in which the parking space is in a public lot. The server 150 may route the mobile device 150 to the area of the new lot including the parked vehicle. Thus, the vehicle associate with the mobile device 150 will have easy access to new parking spot before others can see the parking space as it becomes free or before any parking space monitoring system displays a notification that a space has become available.

The server 125 may also request a payment from the mobile device 150 as a relocation fee for causing the parking spot to become available. The payment may be a default amount. The payment may be a function of the location of the parking space, the time of day, the day of week, or other factors. The payment may be a subscription service (i.e., mobile device 150 has unlimited access to parking relocations in exchange for a monthly fee).

The payment request may also offer a partial (or full) refund of the payment if the mobile device 150 provides information to return the parking space to the relocated autonomous vehicle. For example, the mobile device 150 may send a message to the server when the user is 5-10 minutes from vacated the parking space. The server 125 may generate another instruction for the relocated autonomous vehicle to return to the parking space when the vehicle associated with the mobile device 150 is soon leaving or has left.

In some examples, the autonomous vehicles are visibly marked. The autonomous vehicles may include writing on the side of the vehicle that informs others that the vehicle is an autonomous vehicle. Alternatively, the autonomous vehicles may include specialized license plates, a window sign, or a magnetic car sign that indicates that the vehicle is an autonomous vehicle. Other drivers (e.g., the driver associated with mobile device 150) may see the parked autonomous vehicles. Thus, the original request for a parking space from the mobile device 150 may indicate the specific parking space requested. The user may read an identifier (e.g., autonomous car number, license plate number) from the autonomous vehicle and provide the identifier with the request for the parking space.

Alternatively, the mobile device 150 may access an application that displays the locations of nearby parked autonomous car. The driver drives to the location of one of the parked autonomous cars and selects that car on the application. In response, the server 125 instructs the parked car to vacate the parking space.

In another example, the application informs the user when relocatable autonomous cars are nearby. The notification may be a vibration or ring that increases in intensity as the distance between the potential parking space and the user's final destination decreases. For example, the user has entered a destination and received routing direction to the destination. As the user approaches within a predetermined distance (e.g., 4 blocks) to the destination, the application begins search for autonomous vehicles suitable for relocation. The application notifies the user using vibration or an audible alert. The intensity of the alert may be selected as a function of the location of the autonomous car. Autonomous vehicles that could potentially open up parking spaces farther from the destination receive alerts with low intensity, and autonomous vehicles that could potentially open up parking spaces closer to the destination receive alerts with higher intensity. The intensity relates to the duration or volume of an audible alert or the strength of a vibration.

In one example, the intensity of the alerts depends on the time savings. For example, a user parks in a parking space that is 20 minutes walking from his destination. When another space is available for relocation and the new parking space is 8 minutes from the destination, 80% of max volume intensity is used for the alert. However, when another space is available for relocation and the new parking space is 1 minute from the destination, 95% of max volume intensity is used for the alert. Different settings may be applied for different days of the week, at different times of the day, or as a function of traffic levels.

Figure 4:
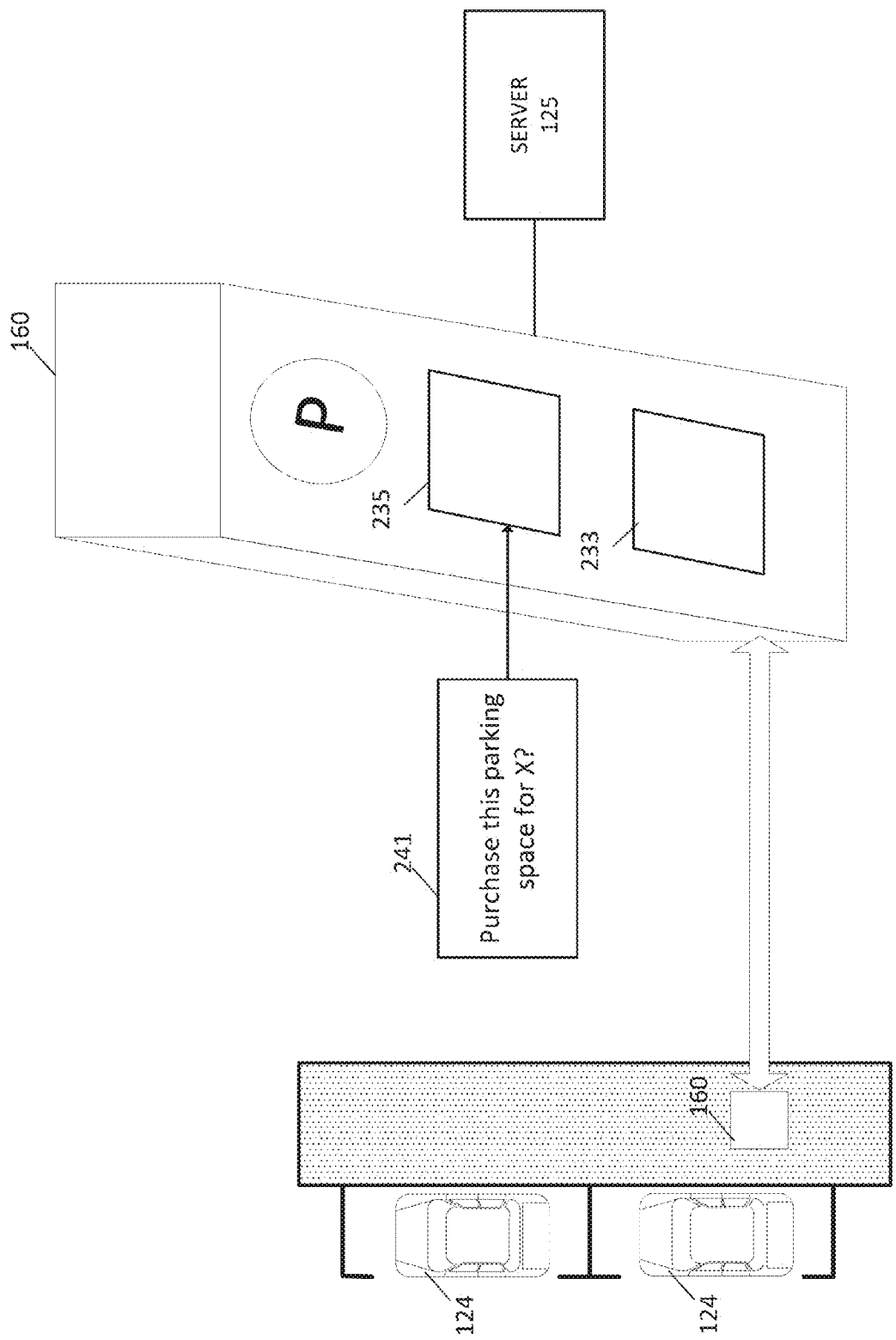
FIG. 4 illustrates an example kiosk for optimizing parking.

FIG. 4 illustrates an example kiosk 160 for optimizing parking. Near the kiosk 160, one or more vehicles 124 are parked. The vehicles 124 may be autonomous vehicles. The kiosk 160 may allow a user to provide instructions to the vehicles. The kiosk 160 includes an interface portion 235 and a payment portion 233. The user approaches the kiosk 160 and is shown the message 141. The message 141 may provide an opportunity for the user the instruct one of the vehicles to vacate the parking space. The message 141 may state "purchase this parking space for X dollars?" The user may accept the offer and provide payment to the payment portion 233. In response, the kiosk 161 sends an instruction to the vehicle 124 to vacate the parking space.

In some examples, the server 125 is omitted and the communication is between the kiosk 160 and the user only. Also, the user may communicate directly with the autonomous car. That is, the functions of the kiosk 160 may be provided by a panel or interface physically located on the autonomous car. In another example, the mobile device 150 may communicate directly with the autonomous vehicle using wireless communication (e.g., cellular, Bluetooth protocols, near field communication, or IEEE 802 family of protocols).

In another example, the vehicles 124 associated with the kiosk 160 are rental vehicles. The kiosk 160 allows the user to rent one of the vehicles. However, according to the examples above, the kiosk 160 directs the user to another vehicle a few minutes away in order to open up that vehicle's parking space.

Figure 5:
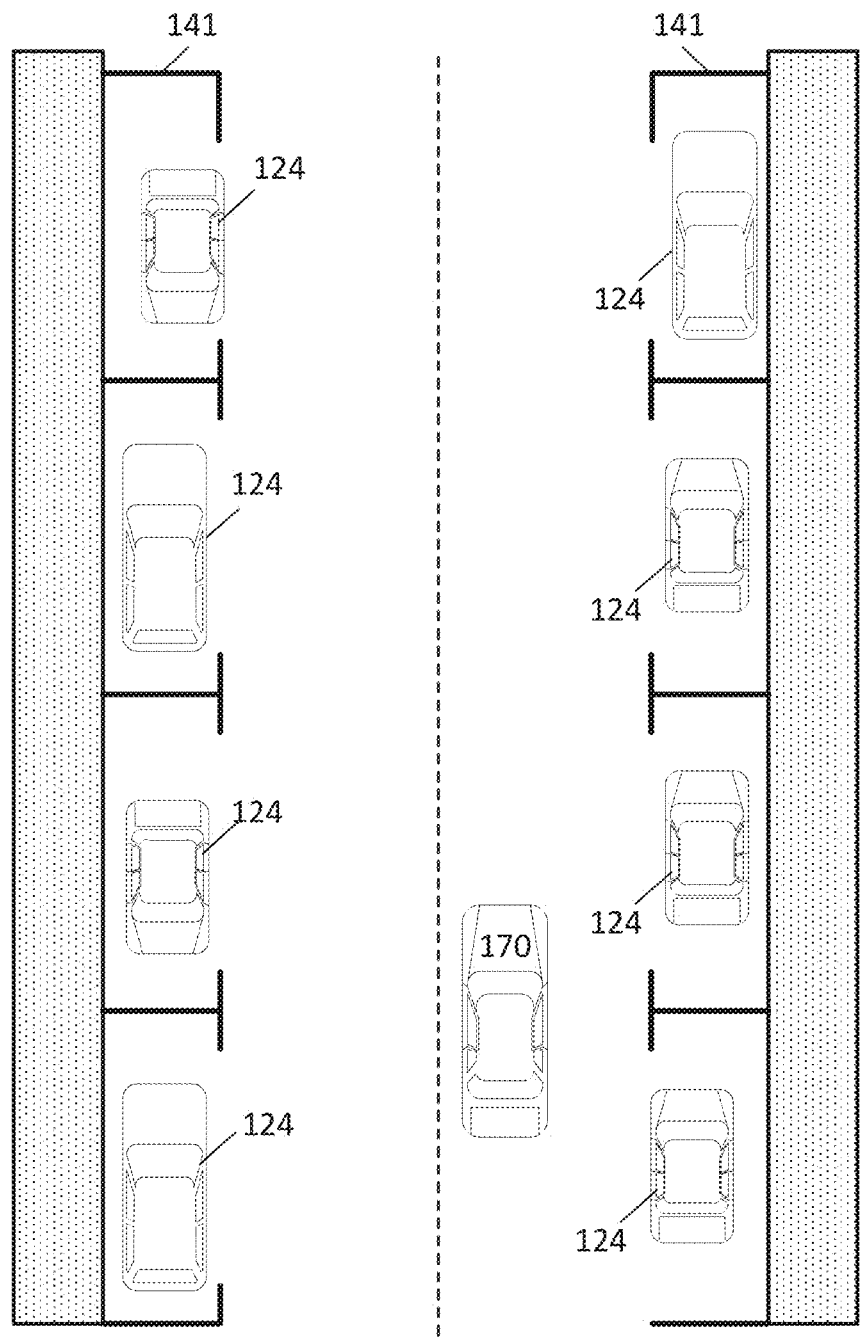
FIG. 5 illustrates an example parking arrangement before optimization.
Figure 6:
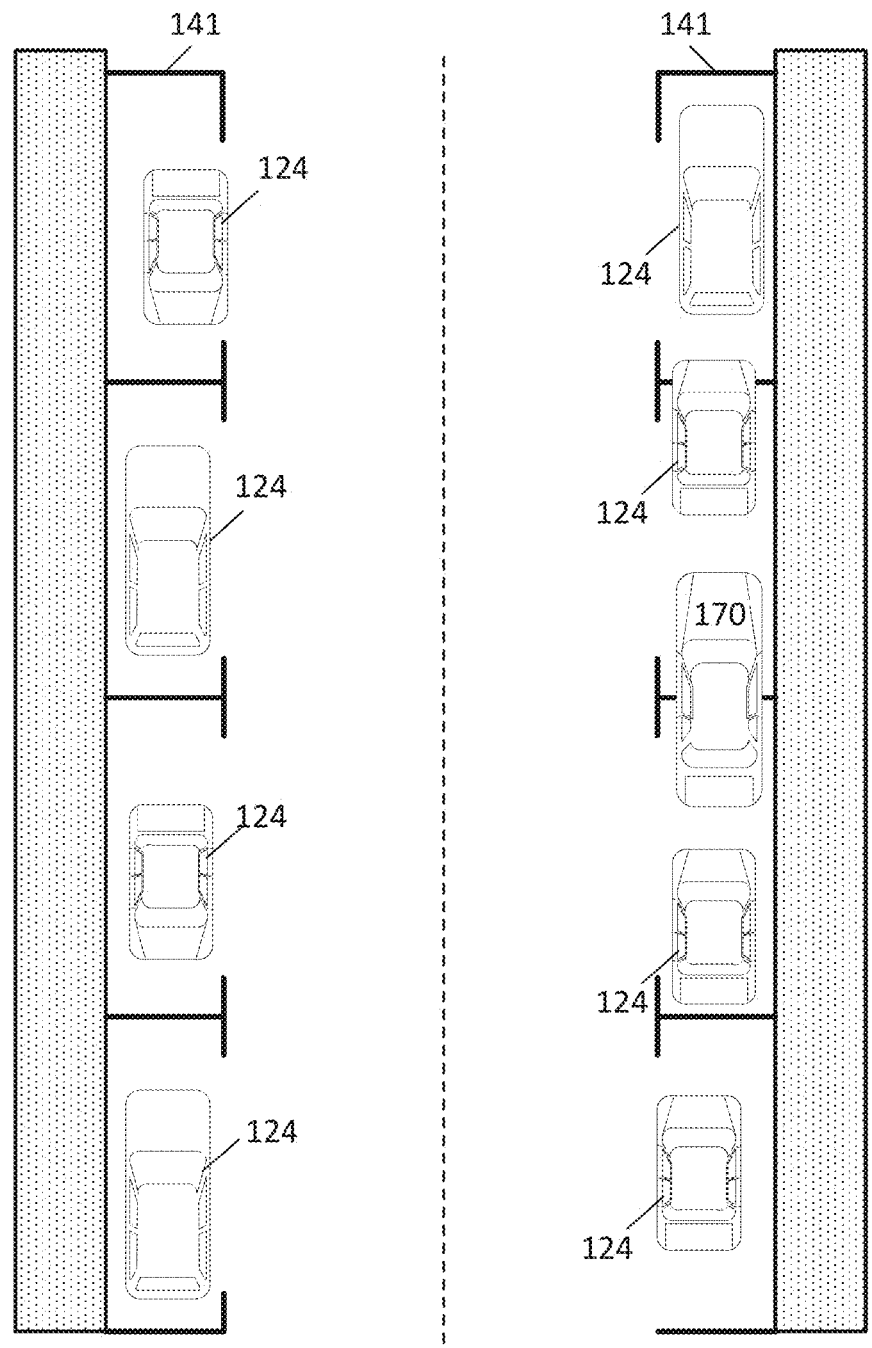
FIG. 6 illustrates an example parking arrangement after optimization.

FIG. 5 illustrates an example parking arrangement before optimization. The parking spaces 141, which may or may not be delineated by painted lines, include extra spaces. Some vehicles are smaller than other vehicles. Municipalities generally draw parking lines to be much larger than the average vehicle. In addition, people generally park farther than necessary away from adjacent vehicles. As illustrated in FIG. 5, at least one additional vehicle could be parked if the other vehicles were more efficiently spaced. In FIG. 5, there is no room for vehicle 170. FIG. 6 illustrates an example parking arrangement after optimization with plenty of room for vehicle 170 to park. Several techniques may be available to take advantage of the extra space between cars.

In one example, the rates charged for parking may be adjusted based on the proximity of the vehicle to other cars and/or the size of the vehicle. For example, the vehicle may include a distancing system (e.g., camera, laser, light detection and ranging device) that measures the distance from the vehicle to the downstream vehicle (in front of the parking car) and/or the upstream vehicle (behind the parking car). The car distance information is communicated from the mobile device 122 to the server 125 or kiosk 160. The server 125 or the kiosk 160 calculates a parking rate as a function of the distance. For example, the parking rate may be reduced by 10% when the car is parked within 50 centimeters (cm) of one or more neighboring cars and may be reduced by 20% when the car is parked within 20 cm of one or more. The mobile device 122 may display the parking rate while the use is parking to incentive closer parking. The parking rate may be calculated and/or displayed by a stand-alone device such as kiosk 160.

In another example, autonomous vehicles are instructed to move to take up the extra parking space. One or more of the vehicles 124 parked in parking spaces 141 are autonomous vehicles. The autonomous vehicles 124 are instructed to move closer to one another to free up more parking space for vehicle 170. In one example, the server 125 monitors the locations of vehicles 124 and determines when there is enough extra space between vehicles to create another parking space. The server 125 may instruct one or more of the autonomous vehicles to move to create an extra parking space. The server 125 may determine when the aggregate extra space between multiple vehicles is enough for an extra parking space. In another example, the autonomous vehicles may independently issue instructions to move themselves closer together.

The autonomous vehicles may include a distance sensor (e.g., camera, laser, light detection and ranging). The autonomous vehicles may automatically park within a pre-determined distance (e.g., 20 cm) to the vehicle downstream. In one example, after the driver or passenger(s) exit the autonomous vehicle, the autonomous vehicle moves forward as far as possible.

In some example, another driver may notice that one or more autonomous vehicles are parked in an arrangement that could be moved in order to free up another parking space. In one example, a very small car has moved leaving room for only another small car, but if an adjacent autonomous car moves forward or backward in the space, another average sized vehicle could fit. The driver may request that the autonomous car move using a mobile application described above, by communicating directly with the autonomous vehicle, or by communicating with the kiosk 160.

This may be particularly advantageous to a large vehicle (e.g., limousine or large truck) that is difficult to park on the street. For example, the large vehicle driver may see one parking space in front of an autonomous car and another parking space behind the autonomous car. The large vehicle drive through mobile device 125 contact server 125 and requests that the autonomous vehicle move. For example, if the autonomous vehicle moves across the street, now three adjacent spaces are free, which may be enough space for the large vehicle. The server 125 may charge a fee proportional to the size of the large vehicle or the number of adjacent spaces to the large vehicle using the mobile device 122 or the kiosk 160.

Figure 7:
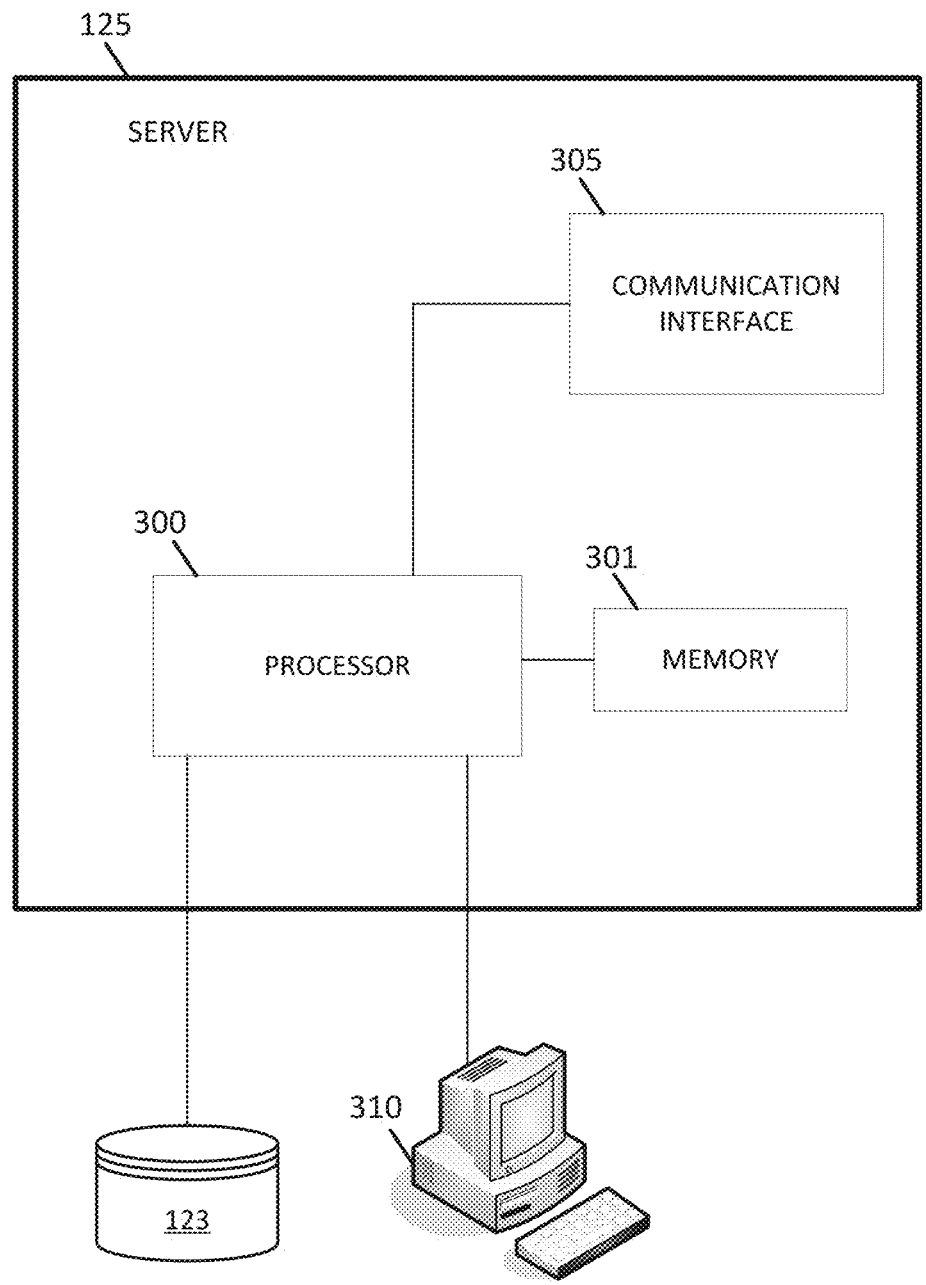
FIG. 7 illustrates an example network device of the system of FIG. 1.
Figure 8:
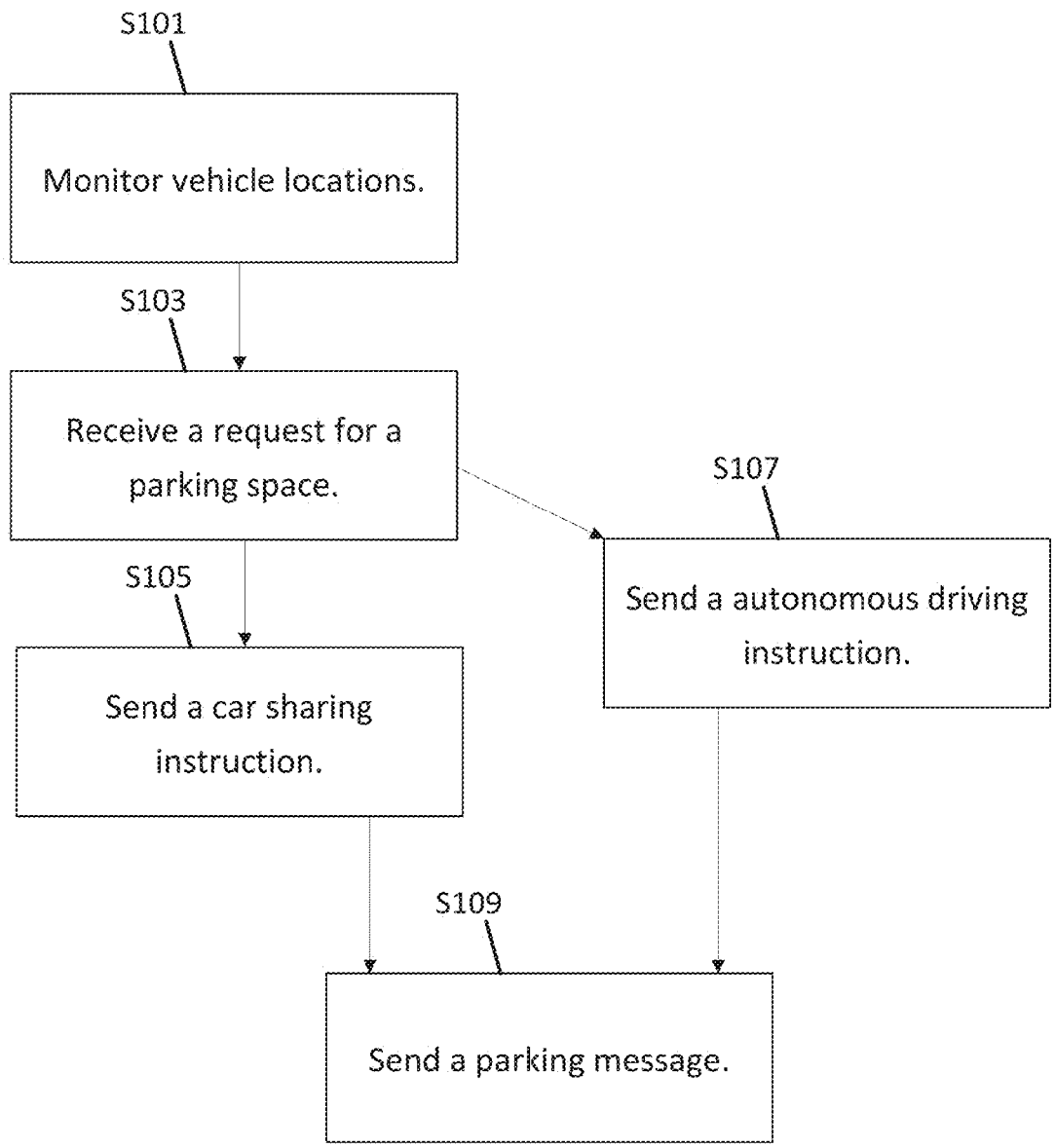
FIG. 8 illustrates an example flowchart for parking optimization.

FIG. 7 illustrates an example network device (e.g., server 125) of the system of FIG. 1. The server 125 includes a processor 300, a communication interface 305, and a memory 301. The server 125 may be coupled to a database 123 and a workstation 128. The workstation 128 may be used as an input device for the server 125 for entering values for the thresholds, geographic regions, or other values. In addition, the communication interface 305 is an input device for the server 125. In certain embodiments, the communication interface 305 may receive data indicative of user inputs made via the workstation 128 or the mobile device 122. FIG. 8 illustrates an example flowchart for parking optimization. The acts of the flowchart of FIG. 8 may alternatively be performed by the server 125 or another computing device. Different, fewer, or additional acts may be included.

At act S101, the processor 300 monitors vehicle locations. The vehicles may report their GPS locations to the server 125 periodically or upon request. The server 125 may maintain a list of current locations of the vehicles in memory 301. The server 125 may make location information available through a map on a website or mobile application.

The website or mobile application may have multiple interfaces. One interface may allow an operator of shared vehicles to manage the locations of the shared vehicles. Another interface may allow autonomous vehicle users to see the current location of their vehicles. A third interface may allow drivers to request that parking spaces be released. The website or mobile application allows the exchange of parking spaces for money.

At act S103, the processor 300 or the communication interface 305 receives a request for a parking space. The request may be received by a vehicle that is not monitored in act S101. The request may include a current geographic position of the requester or a destination of the requester.

In response to the parking request, the processor 300 may perform act S105, act S107, or both. In act S105, the processor 300 generates, and communication interface 305 sends, a car sharing instruction. The car sharing instruction may only be sent when there is a pending request for a car sharing vehicle. When more than one parked shared car is available for the pending request, the processor 300 selects the one that is nearest the geographic position from the parking requestor. Therefore, the shared car will be moved and the parking spot made available for the parking requestor.

At act S107, the processor 300 generates, and communication interface 305 sends, an autonomous driving instruction. The autonomous driving instruction may be sent to the parked autonomous car that is closest to the geographic position from the parking requestor. The autonomous driving instruction may instruct the parked autonomous car to move to another parking space. Alternative parking locations may be sent with the instruction. The autonomous driving instruction may instruct the parked autonomous car to move closer to an adjacent vehicle. The autonomous driving instruction may instruct the autonomous car to drive around for a time period. The instruction includes a return time to return to the parking space. The return time may be requested in the parking request of act S103.

At act S109, the processor 300 or the communication interface 305 sends a parking message to the sender of the parking request in act S103. The parking message may include a request for payment for relocating the vehicle from the parking spot. The payment may be flat fee or based on the return time specified by the parking request and included in the relocation instruction. The payment may be partially distributed to the owner of the autonomous vehicle or the car sharing user.

The processor 300 may also be configured to match the relocated car (either the shared vehicle or the autonomous vehicle) with the vehicle that sent the parking request in act S103. In some examples, the parking request may specify the size of the vehicle by length (e.g., 20 feet) or by class (e.g., small, medium, or large). In another example, the mobile device 122 sending the parking request may be programmed with the dimensions of the associated vehicle. The processor 300 may dismiss potential vehicles for relocations based on the vehicle of the parking requestor. The processor 300 may execute a vehicle dimensions matching process to attempt to find a vehicle to relocation that leaves enough space for the vehicle of the parking requestor. In some examples, the parked car may also detect the available space around them (e.g., camera, laser, or LIDAR) and determine how much total space would be available if the parked car was moved.

Figure 9:
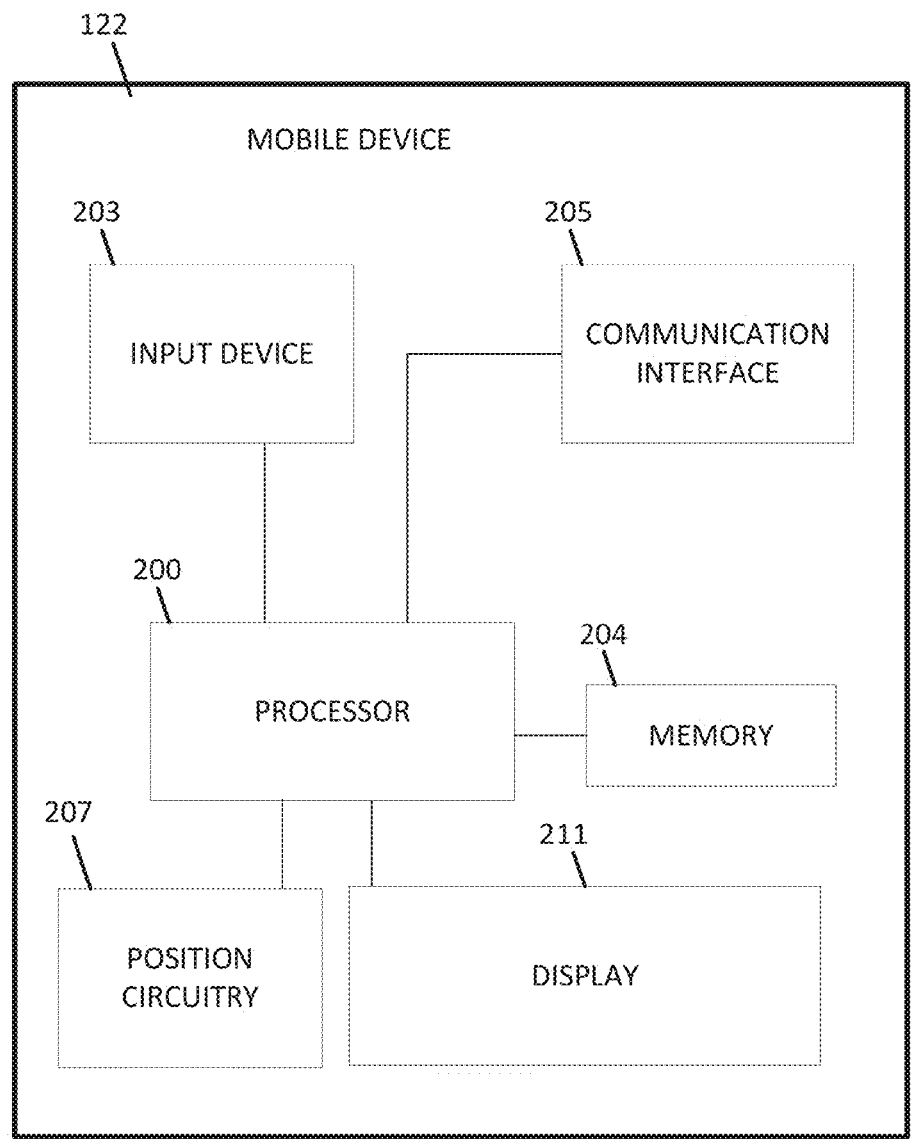
FIG. 9 illustrates an example mobile device for the system of FIG. 1.

FIG. 9 illustrates an exemplary mobile device 122 of the system of FIG. 1. The mobile device 122 includes a processor 200, a memory 204, an input device 203, a communication interface 205, position circuitry 207, and a display 211. Additional, different, or fewer components are possible for the mobile device 122.

The mobile device 122 may be a smart phone, a laptop, or another user specific device. The mobile device 122 may be incorporated into the vehicle such as in a navigation system or an automated driving system. The automated driving system may be an advanced driving assistance system (ADAS), a highly assisted driving (HAD) device or an autonomous vehicle, any of which may be referred to as a computing device.

The processor 200 monitors the location of the mobile device 122 through the position circuitry 207. In the example of automated driving systems, the location may be reported every time the ignition is turned off or turned on. In another example, the location is reported periodically, such as every second, every minute, or every hour. The period may be dependent on the state of the car. For example, moving mobile device 122 report location every second and stationary mobile device report location every hour.

The mobile device 122, when associated with a user looking for parking, may generate a request for parking. The processor 200 may pair the current geographic position of the mobile device 122 with a message that requests a parking location. The request may be based on a routing instruction (e.g., the mobile device 122 is nearing a destination of a route). The request may be based on a user entry made to input device 203. For example, the user may have noticed an autonomous vehicle or a shared vehicle is a desirable parking space.

In all of these examples, the processor 200 is configured to identify an available subset of shared vehicles based on the geographic location of the second mobile device and select, in response to the request for the parking space, one of the available subset of shared vehicles based on the geographic location.

A different mobile device 122, when associated with an autonomous vehicle or a shared vehicle, may receive an instruction to vacate a parking space. In some example, the instruction may ask that the vehicle move forward or backward a small distance (e.g., 1-3 meter, 1-10 feet, or another distance). In another example, the instruction may request the vehicle move to a completely different parking space.

In another example, the instruction may modify an appointment for a shared vehicle. The instruction may modify an existing reservation to a vehicle that could be moved to satisfy the parking request. The instruction may affect a future reservation so that a vehicle is selected that could be moved to satisfy the parking request. In any of these examples, the processor 200 is configured to generate an instruction for the second mobile device including an identifier of the selected one of the shared vehicles.

The locations of the autonomous vehicles and the shared vehicles may be stored in geographic database 123. In addition, routing instructions that trigger the requests for parking may be based on road link and traffic data stored in the database 123. The road link data records may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments), as well as points of interest (POIs).

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The workstation 128 may be a general purpose computer including programming specialized for providing input to the server 125. For example, the workstation 128 may provide settings for the server 125. The settings may include the geographic ranges for matching parking requests with potential relocation requests. The settings may enable or disable features. For example, some embodiments may only include the autonomous relocation feature, some embodiments may only include the shared vehicle diversion feature, and other embodiments may only include the adjacent vehicle proximity feature. The workstation 128 may include at least a memory, a processor, and a communication interface.

The vehicles 124, including the shared vehicles, may be assisted driving vehicles. Assisted driving vehicles include autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

A HAD vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane.

The computing device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The mobile device processor 200 and/or the server processor 300 may be a single device or combinations of devices, such as associated with a network, distributed processing, or cloud computing. The computing device processor 200 and/or the server processor 300 may also be configured to cause an apparatus to at least perform at least one of methods described above.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The mobile device 122 may communicate with the network 127 and or the server 125 using wireless communication. The wireless communication may include the family of protocols known as WiFi or IEEE 802.11, the family of protocols known as Bluetooth, the family of protocols knows as near field communication (NFC), or cellular technologies (analog advanced mobile phone system (AMPS), the global system for mobile communication (GSM), third generation partnership project (3GPP), code division multiple access (CDMA), personal handy-phone system (PHS), and 4G or long term evolution (LTE) standards), or another protocol. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
monitoring, with a processor, locations of a plurality of parked autonomous vehicles, the locations of the plurality of autonomous vehicles determined based on global positioning system data received from the plurality of autonomous vehicles;
receiving a user request for a parking space associated with a geographic location;
selecting, with the processor, one of the plurality of autonomous vehicles occupying a parking space associated with the geographic location;
generating, with the processor, an instruction to vacate the parking space occupied by the selected autonomous vehicle in response to the user request, wherein the instruction includes data identifying the selected autonomous vehicle; and
providing an incentive for the selected autonomous vehicle to vacate the parking space occupied by the selected autonomous vehicle.

2. The method of claim 1, wherein the instruction is an autonomous driving instruction for the selected autonomous vehicle to vacate the parking space based on the geographic location.

3. The method of claim 2, wherein the autonomous driving instruction includes a location of an alternative parking space for the selected autonomous vehicle.

4. The method of claim
1, wherein the processor is a processor of a server or a mobile device.

5. The method of claim 1, wherein the instruction includes an incentive to vacate the parking space occupied by the selected autonomous vehicle.

6. The method of claim 1, wherein the user request for the parking space of the selected autonomous vehicle includes a relocation fee payment from the user as the incentive for the autonomous vehicle to vacate the parking space occupied by the selected autonomous vehicle.

7. An apparatus comprising:

at least one processor; and at least one memory including computer program code for one or more programs, the at least one memory and the computer program code configured to, with the at least one processor, cause the apparatus to at least:

monitor locations of a plurality of parked autonomous vehicles, the locations of the plurality of vehicles determined based on global positioning system data received from each vehicle of the plurality of autonomous vehicles;

receive a request for a parking space from a mobile device, wherein the request includes a geographic location of the mobile device;

select one of the plurality of autonomous vehicles that is located at a parking space within a predetermined distance of the geographic location of the mobile device;

generate an autonomous driving instruction for the selected one of the plurality of autonomous vehicles to vacate the parking space in response to the request for the parking space from the mobile device; and provide an incentive for a user associated with the selected autonomous vehicle to vacate the parking space of the selected one of the plurality of vehicles.

8. The apparatus of claim 7, wherein the autonomous driving instruction includes an alternative parking location for the selected one of the plurality of autonomous vehicles.

9. The apparatus of claim 7, wherein the autonomous driving instruction includes a return time for the selected one of the plurality of autonomous vehicles to return to the vacated parking space.

10. The apparatus of claim 7, the at least one memory and the computer program code configured to, with the at least one processor, cause the apparatus to at least:

request a payment from a user associated with the mobile device for the selected autonomous vehicle to vacate the parking space of the selected one of the plurality of vehicles.

11. The apparatus of claim 7, wherein the incentive to vacate the parking space comprises a relocation fee payment.

12. The apparatus of claim 11, wherein the relocation fee payment amount is a function of the location of the parking space, the time of day, or the day of week.

13. An apparatus comprising:

at least one processor; and at least one memory including computer program code for one or more programs, the at least one memory and the computer program code configured to, with the at least one processor, cause the apparatus to at least:

monitor locations of a plurality of parked shared or rental vehicles, the locations of the plurality of shared or rental vehicles determined based on global positioning system data received from each of the plurality of shared or rental vehicles;

receive a request for a parking space from a first mobile device, wherein the request for the parking space includes a geographic location of the first mobile device;

receive a request for a shared or rental vehicle from a second mobile device, wherein the request for the shared or rental vehicle includes a geographic location of the second mobile device;

identify an available subset of shared or rental vehicles from the plurality of shared or rental vehicles based on the geographic location of the second mobile device;

select, in response to the request for the parking space, one of the available subset of shared or rental vehicles based on the geographic location of the first mobile device;

generate an instruction for the second mobile device, wherein the instruction includes data indicative of the selected one of the shared or rental vehicles and an incentive to choose the selected one of the shared or rental vehicles from the available subset of shared or rental vehicles; and assign, in response to the second mobile device choosing the selected one of the shared or rental vehicles, the selected one of the shared or rental vehicles to the second mobile device in order to free up the parking space of the selected one of the shared or rental vehicles for the first mobile device.

14. The apparatus of claim 13, wherein the incentive is a vehicle upgrade for the second mobile device.

15. The apparatus of claim 13, wherein the incentive is a monetary incentive for the second mobile device.

16. The method of claim 13, wherein the assignment provides a rental reservation for the selected one of the shared or rental vehicles.

* * * * *